C. J. MÜHL.
HAND CULTIVATOR.
APPLICATION FILED DEC. 13, 1915.
1,262,230.
Patented Apr. 9, 1918.
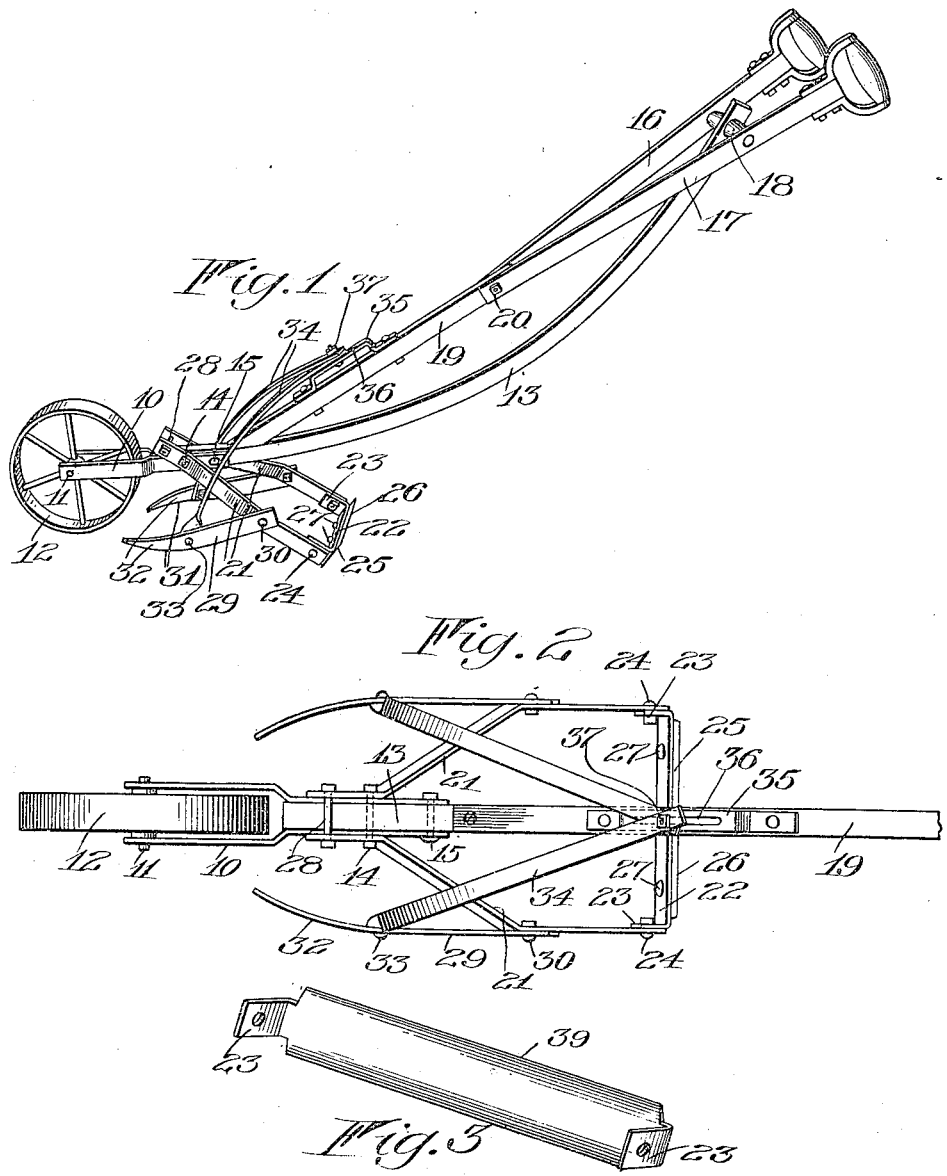
WITNESSES:
INVENTOR
Christian J. Mühl
BY
his ATTORNEYS

UNITED STATES PATENT OFFICE.

CHRISTIAN J. MÜHL, OF WILLIAMSON, NEW YORK.

HAND-CULTIVATOR.

1,262,230.  Specification of Letters Patent.  Patented Apr. 9, 1918.

Application filed December 13, 1915. Serial No. 66,483.

*To all whom it may concern:*

Be it known that I, CHRISTIAN J. MÜHL, of Williamson, in the county of Wayne and State of New York, have invented certain new and useful Improvements in Hand-Cultivators; and I do hereby declare the following to be a full, clear, and exact description of the same, reference being had to the accompanying drawings, forming a part of this specification, and to the reference-numerals marked thereon.

My invention relates to cultivators and more particularly to hand cultivators adapted for use especially in connection with the cultivation of onions and other plants, the tendrils of which extend a considerable distance upon each side of the row. One of the objects of the invention is to provide a cultivator adapted for the cultivation of plants having long low-lying tendrils, the cultivator being provided with means for passing under and lifting the tendrils in advance of the cultivating tools and dropping them in the rear thereof without injury to the plants. To these and other ends the invention consists in certain improvements and combinations of parts all as will be hereinafter more fully described, the novel features being pointed out in the claims at the end of the specification.

In the drawings:

Figure 1 is a view in perspective illustrating the preferred embodiment of my improved cultivator;

Fig. 2 is a top plan view, and

Fig. 3 is a detail view of a slightly modified form of cultivating tool.

Similar reference numerals throughout the several views indicate the same parts.

Referring to the drawings by numerals, 10 represents a forked frame provided with an axle 11 upon which is mounted a wheel 12. The frame comprises two rearwardly extending and inwardly converging flat plates, between the rear ends of which is positioned an upwardly curving strut 13 secured between the plates by means of the bolts 14 and 15. A pair of handles 16 and 17 are spaced apart at their outer ends by a brace 18 which is arranged to pass through the outer end of the strut 13 for the purpose of supporting the same. The handles are clamped at their inner or forward ends to an extension 19 by means of a bolt 20. The forward end of the extension is mounted upon the strut 13 and is connected therewith preferably by means of screws, but may be secured in any other suitable manner. Pivotally mounted upon the bolt 14 is a tool supporting member comprising a pair of rearwardly positioned and outwardly and downwardly extending spaced bars 21 between the rear ends of which a cross bar 22 is positioned having inwardly turned ends 23 secured upon the spaced bars 21 by means of the bolts 24. Preferably positioned upon the cross bar 22 is a cultivating tool or knife 25 having cutting edges 26, the knife being secured upon the cross bar by means of suitable bolts or screws 27. The knife or cutting tool is of a width considerably greater than that of the cross bar 22 in order to allow the cutting edge to be forced into the ground a considerable distance for cutting out fine grass and other foreign matter growing between the rows of plants. The knife as shown in Fig. 3 is preferably formed with two cutting edges and is therefore, made reversible so that when one edge becomes dull the other may be used. However, I do not wish to limit myself to this particular form of cutting tool or cross bar which is adapted especially for the purpose of cutting out fine grass from between the rows, it being understood that other forms of cutting tools may be clamped, or otherwise secured, upon the cross bar if desired. Passing through the forward ends of the spaced bars 21 and immediately above the strut 13 is a bolt 28 which bears upon the strut so that by forcing down the handles of the cultivator, the knife 25 will enter the ground as the cultivator is pushed along between the rows of plants. Upon the spaced bars 21 of the tool supporting member are positioned forwardly extending and downwardly inclined tendril lifting members 29 pivoted upon the bars by means of bolts 30. The forward ends of the arms are pointed and the lower edges thereof curved as shown at 31 in order that the same may more freely pass over the ground under the tendrils of the plants as the cultivator is moved between the rows. The front ends of the arms are also curved inwardly a considerable amount, as shown at 32, to prevent the tendril lifting members from running into the rows of plants and cutting or bruising the same.

These members are for lifting the plant tendrils and holding them elevated and directing them laterally, and comprise lower forward ends, or extremities, of the upwardly and rearwardly extending arms, or adjusting devices 34, by means of which the lower ends of the lifting members are positioned, and which complete the manipulations of the tendrils as the cultivator is advanced. The parts 34 are attached to the tendril lifting members as indicated at 33, and extend upwardly and rearwardly forming curved inclines, which serve to elevate and deflect the plant tendrils causing them to fall in rear of the machine. The upper ends of the parts 34 meet and overlap at the center of the machine, and are secured to the frame 19 thereof by means of the bracket 35. The bracket 35 is provided with a longitudinal slot 36 through which a clamping bolt 37 is positioned to receive the upper ends of the inclines 34 which are held clamped by the bolt upon the bracket. By loosening the bolt 37 the tendril lifting member 29 may be raised or lowered for proper adjustment with respect to the knife or cutting tool so that these members may freely pass over the ground under the tendrils of the plants to operate in conjunction with the inclines 34 in lifting the tendrils to allow the knife to pass thereunder, the tendrils falling uninjured in the rear of the knife as the cultivator is pushed along. By inclining the adjusting devices 34 rearwardly and to the center of the machine a marked advantage is obtained in the handling of the tendrils as by this means the tendrils are not so abruptly elevated as they would be if these parts extended in a vertical plane parallel with the rows of plants and furthermore, by the present means, the possibility of causing some of the tendrils to become twisted or thrown upon the opposite side of the row is obviated. If the adjusting members extended upwardly and rearwardly in a vertical plane close to the plants the tendrils would then be elevated to a vertical position before they begin to fall and it has been found in cases of this kind that the momentum of the machine is often sufficient to cause the tendrils to be thrown upon the opposite side of the row. It is for these reasons that I have inclined the adjusting devices both rearwardly and inwardly to the center of the machine whereby the tendrils are permitted to fall rearwardly before they begin to approach a vertical position. By mounting the cultivator upon a single wheel adapted to run in the center of the row I overcome the objection of having the wheels pass over the ends of the tendrils as is often the case in a two-wheeled cultivator. In Fig. 3 I have shown a slightly modified form of cultivating tool or knife, in which the cutting edges 39 are formed integral with the cross bar. The cross bars may be formed in different lengths to accommodate rows of different widths, the spaced bars 21 being sprung outwardly or inwardly to receive said cross bars which are clamped between the ends of the spaced bars 21 at any suitable angle to the horizontal.

While I have shown and described the preferred form of my invention, I do not wish to be limited to the exact construction employed, as it is evident that other detailed forms of construction may be employed in the formation and arrangement of the several parts without departing from the spirit of the invention.

I claim as my invention:

1. In a cultivator, the combination with a wheel and frame mounted thereon, of a cultivating tool supported by the frame and tendril lifting members supported in front of the tool, said members having parts inclined upwardly and inwardly at their rear ends and adapted to lift the tendrils of plants from the ground to allow the cultivating tool to work thereunder.

2. In a cultivator, the combination with a wheel and frame mounted thereon, of a cultivating tool carried by the frame, a tendril lifting member extending forwardly of the tool and inclined inwardly at its front end and extending upwardly in front of the tool and inwardly at its rear end, said member being adapted to lift the tendrils of plants from the ground to allow the cultivating tool to work thereunder.

3. In a cultivator, the combination with a pair of upwardly and rearwardly inclined tendril lifting members having their front and back ends inwardly inclined, of means for supporting the members upon the cultivator, said members being adapted to lift the tendrils of plants from the ground to allow the cultivator to work thereunder.

4. In a cultivator, the combination with a pair of upwardly and rearwardly inclined tendril lifting members having their front ends spaced apart and inclined toward each other, of means for adjustably supporting the members upon the cultivator, said members being adapted to lift the tendrils of plants from the ground to allow the cultivator to work thereunder.

5. A cultivator comprising in combination, a wheel, a frame supported thereon, handles carried by the frame, a tool supporting member pivotally mounted upon the frame, and tendril lifting members having their lower ends carried by the tool supporting member and their upper ends adjustably mounted upon the frame.

6. A cultivator comprising in combination a wheel, a frame mounted thereon having handles, a tool supporting member pivotally mounted upon the frame, forwardly extending tendril lifting members connected with the supporting member, adjusting devices for the lifting members extending upwardly and inwardly therefrom, and means for adjustably securing said adjusting devices on the frame.

7. A cultivator comprising a wheel, a frame pivotally mounted thereon, having handles, a tool supporting member carried by the frame having a cultivating tool mounted thereon, and tendril lifting members carried by the tool supporting member adapted to lift the tendrils of plants from the ground to allow said cultivating tool to work thereunder, said tendril lifting members being inwardly inclined at their front ends.

CHRISTIAN J. MÜHL.

Witnesses:
 RUSSELL B. GRIFFITH,
 HARRIET T. VAY.